Jan. 29, 1957  HIROSHI ITO  2,779,239
FOUR COMPONENT HIGH APERTURE WIDE ANGLE OBJECTIVE LENS
Filed Aug. 24, 1955

INVENTOR.
HIROSHI ITO
ATTORNEY

United States Patent Office 2,779,239
Patented Jan. 29, 1957

2,779,239

FOUR COMPONENT HIGH APERTURE WIDE ANGLE OBJECTIVE LENS

Hiroshi Ito, Setagaya-ku, Tokyo, Japan, assignor to Canon Camera Company, Inc., Tokyo, Japan, a corporation of Japan Application August 24, 1955, Serial No. 530,242

Claims priority, application Japan October 1, 1954

2 Claims. (Cl. 88—57)

This invention relates to a high aperture wide angle lens which is advantageously adaptable particularly to miniature cameras.

The object of this invention is to obtain a lens having an including angle of more than 70 degrees and an aperture of approximately F:2.8 which no human ingenuity could devise heretofore.

The high aperture wide angle lens according to this invention is composed of six lenses in which cemented positive lenses of meniscus style and single negative lenses of meniscus style are arranged approximately symmetrically on both sides of the stop, by arranging all and every curved surface including the cemented surfaces concave toward the stop, specific value being given to each component member.

A clear conception of the scope and purpose of this invention may be obtained from the following description, taken in connection with the attached drawing, in which.

In the figures, $L_1$ and $L_4$ are cemented positive lenses of meniscus style. $L_2$ and $L_3$ are single negative lenses of meniscus style. $L_1$, $L_2$ and $L_3$, $L_4$ are arranged approximately symmetrically on both sides of a stop so as to position each and every curved surface concave toward the stop. In this assembly the following conditions are observed:

$$0.12 > n_2 - n_1 > 0.03 \quad 32 > v_2 - v_1 > 10$$
$$1.30 > n_3 > 1.64 \quad 34 > v_3 > 26$$
$$1.80 > n_4 > 1.55 \quad 45 > v_4 > 26$$
$$0.15 > n_5 - n_6 > 0.03 \quad 32 > v_5 - v_6 > 10$$

By giving the above magnitudes to the refractive index $n$ and the Abbe number $v$, and furthermore, by taking respective absolute value of the radii of curvature $r_2$ and $r_9$ of the cemented surfaces of the lenses, $L_1$ and $L_4$ and of the concave surfaces $r_5$ and $r_6$ toward the stop of lenses $L_2$ and $L_3$ as $$0.30f > r_2 > 0.20f \quad 0.50f > |r_9| > 0.20f$$
$$0.26f > r_5 > 0.18f \quad 0.45f > |r_6| > 0.16f$$

where $f$ is the focal length of the whole objective, such a high aperture wide angle lens as with wide including angle of more than 70 degrees and having aperture of approximately F=2.8 is obtainable.

An example of embodiment of this invention is given below, in which:

$f = 1.0$   $F = 2.8$   Including angle = 72 degrees.

| $r$ | $d$ | $n_d$ | $v$ |
|---|---|---|---|
| $r_1 = 0.4329$ | $d_1 = 0.047$ | 1.6166 | $v_1 = 36.6$ |
| $r_2 = 0.2465$ | $d_2 = 0.083$ | 1.6970 | $v_2 = 54.7$ |
| $r_3 = 0.8240$ | $d_3 = 0.002$ | | |
| $r_4 = 0.2900$ | $d_4 = 0.070$ | 1.7400 | $v_3 = 28.2$ |
| $r_5 = 0.2021$ | $d_5 = 0.190$ | | |
| $r_6 = -0.2090$ | $d_6 = 0.021$ | 1.6889 | $v_4 = 31.1$ |
| $r_7 = -0.2671$ | $d_7 = 0.001$ | | |
| $r_8 = -1.2910$ | $d_8 = 0.131$ | 1.6583 | $v_5 = 57.1$ |
| $r_9 = -0.2460$ | $d_9 = 0.029$ | 1.5673 | $v_6 = 42.8$ |
| $r_{10} = -0.3920$ | | | |

Figure 1:
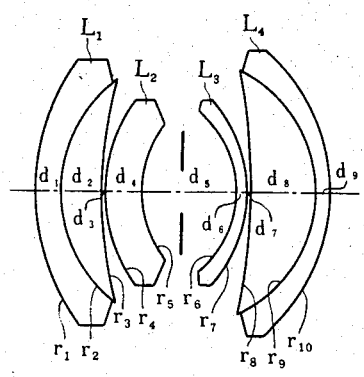
Fig. 1 shows a sectional view of an embodiment with respect to the high aperture wide angle lens according to this invention.
Figure 2:
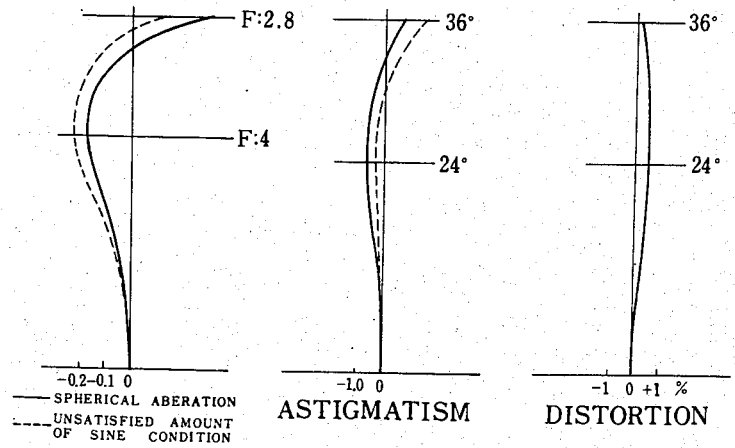
Fig. 2 shows aberration curves regarding said lens.

Fig. 2 shows the aberrations on line $d$ obtained as the result of calculation taking $f = 100$ in accordance with the above embodiment. As easily observed from these curves, the various aberrations are quite insignificant. Thus a lens of F=2.8 aperture grade having a higher aperture than that present in prior known wide angle lenses having an including angle of more than 70 degrees is obtainable.

In this invention, the above specific values are given to $r_2$ and $r_9$ for the above component lenses with an object to remove completely the chromatic aberration and also to minimize the special aberration due to the oblique pencil of light. Furthermore, the above values are given on $r_5$ and $r_6$ with the further object to remove astigmatism and axial spherical aberration. Also according to the above mentioned arrangement of the lenses approximately symmetrical in respect to the stop, the distortion is readily eliminated.

I claim:

1. A high aperture wide angle lens comprising a stop, a plurality of cemented positive lenses of meniscus style and a plurality of single negative lenses of meniscus style are arranged approximately symmetrically on the both sides of the stop, all of the curved surfaces including the cemented surface are faced concave toward the stop and in which the values of the refractive indices, $n_{subscript}$, in the helium D-line and the Abbe numbers, $v_{subscript}$, of the lenses in succession from the object to the image side of the lens array are as follows:

$$0.12 > n_2 - n_1 > 0.03 \quad 32 > v_2 - v_1 > 10$$
$$1.30 > n_3 > 1.64 \quad 34 > v_3 > 26$$
$$1.80 > n_4 > 1.55 \quad 45 > v_4 > 26$$
$$0.15 > n_5 - n_6 > 0.03 \quad 32 > v_5 - v_6 > 10$$

and the radii of curvature $r_2$ and $r_9$ of the cemented surfaces of the cemented positive lenses and the radii of curvature $r_5$ and $r_6$ of the concave surfaces of the single negative lenses adjacent to the stop have the following absolute values:

$$0.30f > r_2 > 0.20f \quad 0.50f > |r_9| > 0.20f$$
$$0.26f > r_5 > 0.18f \quad 0.45f > |r_6| > 0.16f$$

where $f$ is the focal length of the whole objective.

2. A high aperture wide angle lens array comprising in succession from the object to the image side thereof, a first cemented positive lens of meniscus shape, a first single negative lens of meniscus shape air spaced from the first cemented positive lens, a diaphragm air spaced from the first single negative lens, a second single negative lens of meniscus shape air spaced from the diaphragm, and a second cemented positive lens of meniscus shape air spaced from the second single negative lens, each concave surface of each lens inclusive of the cemented surfaces of the first and second positive lenses facing the diaphragm, and having the following values of the radii of curvature, $r_{subscript}$, the lens thicknesses and air spaces, $d_{subscript}$, at the optical axis of the array, and the refractive indices, $n_D$, and Abbe numbers, V, of the glass of the lens elements in the stated succession:

[f 1.0   F 2.8   Including angle—72 degrees.]

| Lens | Radii, r | Thickness and Distances, d | $n_D$ | V |
|---|---|---|---|---|
| $L_1$ | $r_1 = 0.4329$ | $d_1 = 0.047$ | 1.6166 | 36.6 |
|  | $r_2 = 0.2465$ | $d_2 = 0.063$ | 1.6970 | 54.7 |
|  | $r_3 = 0.8240$ | $d_3 = 0.002$ |  |  |
| $L_2$ | $r_4 = 0.2900$ | $d_4 = 0.070$ | 1.7400 | 28.2 |
|  | $r_5 = 0.2021$ | $d_5 = 0.190$ |  |  |
| $L_3$ | $r_6 = 0.2090$ | $d_6 = 0.021$ | 1.6889 | 31.1 |
|  | $r_7 = -0.2671$ | $d_7 = 0.001$ |  |  |
| $L_4$ | $r_8 = -1.2910$ | $d_8 = 0.131$ | 1.6583 | 57.1 |
|  | $r_9 = -0.2460$ | $d_9 = 0.029$ | 1.5673 | 42.8 |
|  | $r_{10} = -0.3920$ |  |  |  |

References Cited in the file of this patent

UNITED STATES PATENTS

| | | |
|---|---|---|
| 2,031,792 | Richter | Feb. 25, 1936 |
| 2,171,640 | Berek | Sept. 5, 1939 |
| 2,670,659 | Tronnier | Mar. 2, 1954 |
| 2,724,994 | Lange | Nov. 29, 1955 |

FOREIGN PATENTS

| | | |
|---|---|---|
| 376,044 | Great Britain | July 7, 1932 |
| 474,044 | Italy | Aug. 26, 1952 |
| 689,916 | Great Britain | Apr. 8, 1953 |